United States Patent
Endo et al.

(10) Patent No.: US 8,873,607 B2
(45) Date of Patent: Oct. 28, 2014

(54) COMMUNICATION INTERFACE DEVICE

(75) Inventors: Satoshi Endo, Tokyo (JP); Yoshiaki Koizumi, Tokyo (JP); Toshiyasu Higuma, Tokyo (JP); Takuya Mukai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/977,164

(22) PCT Filed: Jan. 27, 2011

(86) PCT No.: PCT/JP2011/051670
§ 371 (c)(1),
(2), (4) Date: Jun. 28, 2013

(87) PCT Pub. No.: WO2012/101808
PCT Pub. Date: Aug. 2, 2012

(65) Prior Publication Data
US 2013/0287075 A1 Oct. 31, 2013

(51) Int. Cl.
*H04B 1/38* (2006.01)
*H04L 25/02* (2006.01)
*H04L 12/64* (2006.01)

(52) U.S. Cl.
CPC ........ *H04L 25/0262* (2013.01); *H04L 12/6418* (2013.01)
USPC ....................................... 375/220

(58) Field of Classification Search
USPC .................. 375/220, 224, 225, 228, 257, 377
See application file for complete search history.

(56) References Cited

U.S. PATENT DOCUMENTS

| | | | | |
|---|---|---|---|---|
| 6,161,203 A * | 12/2000 | Zuranski et al. | ............... | 714/707 |
| 6,201,829 B1 * | 3/2001 | Schneider | ...................... | 375/221 |
| 7,035,201 B2 * | 4/2006 | Fu et al. | ........................ | 370/208 |
| 7,069,037 B2 * | 6/2006 | Lott et al. | ....................... | 455/522 |
| 7,466,247 B1 * | 12/2008 | Gorbics | .......................... | 341/61 |
| 2006/0227911 A1 * | 10/2006 | Millman et al. | ............... | 375/348 |

FOREIGN PATENT DOCUMENTS

| JP | H09-153923 A | 6/1997 |
|---|---|---|
| JP | H011-055231 A | 2/1999 |
| JP | 3199666 B2 | 6/2001 |
| JP | 2006-303928 A | 11/2006 |

OTHER PUBLICATIONS

International Search Report of the International Searching Authority mailed Mar. 1, 2011 for the corresponding international application No. PCT/JP2011/051670 (with English translation).

* cited by examiner

*Primary Examiner* — Khanh C Tran
(74) *Attorney, Agent, or Firm* — Posz Law Group, PLC

(57) ABSTRACT

A sampler samples a receive signal received via a dedicated communication line. A data transfer rate adjuster measures a data transfer rate based on a number of start bit samples contained in the receive signal. A bit determiner makes a bit determination regarding the receive signal at the data transfer rate measured by the data transfer rate adjuster, to thereby acquire serial data contained in the receive signal. A transmitter sends, via the dedicated communication line, a transmit signal containing serial data sent by an MPU. An MPU communicator outputs to the transmitter the serial data sent by the MPU, and outputs to the MPU the serial data acquired by the bit determiner. The data transfer rate adjuster adjusts, when the transmitter sends the transmit signal multiple times at different data transfer rates, the data transfer rate based on the receive status of respective response signals thereto.

13 Claims, 12 Drawing Sheets

COMMUNICATION INTERFACE DEVICE

CROSS REFERENCE TO RELATED APPLICATIONS

This application is a U.S. national stage application of the International Patent Application No. PCT/JP2011/051670 filed on Jan. 27, 2011.

TECHNICAL FIELD

The present invention relates to a communication interface device among air conditioners that implement a communication function using sampling techniques for a serial interface.

BACKGROUND ART

Communication processing systems and the like have been proposed that detect a data transfer rate based on received serial data and perform sampling at an optimal frequency depending on the data transfer rate (for example, refer to Patent Literature 1 and 2).

For example, a communication processing system disclosed in Patent Literature 2 detects a data transfer rate based on a communication signal and generates a sampling clock depending on the detected data transfer rate. Furthermore, this communication processing system selects, among multiple sampling filter circuits with different frequency characteristics, a sampling filter circuit depending on the detected data transfer rate, and performs sampling at an optimal frequency depending on the data transfer rate of an input signal.

CITATION LIST

Patent Literature

PTL 1: Japanese Patent No. 3199666
PTL 2: Unexamined Japanese Patent Application Kokai Publication No. 2006-303928

SUMMARY OF INVENTION

Technical Problem

Thus, the techniques to detect a data transfer rate base on a communication signal and to perform sampling at an optimal frequency depending on the data transfer rate have conventionally been known. However, a technique to determine a data transfer rate based on received serial data and to adapt the data transfer rate depending on a communication environment has not been established.

In consideration of the above described situation, an objective of the present invention is to provide a communication interface device that is capable of adapting the data transfer rate depending on a communication environment.

Solution to Problem

In order to achieve the above objective, a communication interface device according to the present invention is a communication interface device for processors, the communication interface device comprising: a sampler that samples a receive signal received via a communication line; a data transfer rate measurer that measures a data transfer rate based on a number of start bit samples contained in the receive signal; a bit determiner that makes a bit determination regarding the receive signal at the data transfer rate measured by the data transfer rate measurer, to thereby acquire serial data contained in the receive signal; a transmitter that sends, via a communication line at the data transfer rate measured by the data transfer rate measurer, a transmit signal containing serial data sent by the processor; a processor communicator that outputs to the transmitter the serial data sent by the processor, and outputs to the processor the serial data acquired by the bit determiner; and an adjuster that adjusts, when the transmitter sends the transmit signal multiple times at different data transfer rates, the data transfer rate based on the receive status of respective response signals thereto.

Advantageous Effects of the Invention

According to the present invention, when the transmitter sends the transmit signal multiple times at different data transfer rates, the adjuster adjusts the data transfer rate based on the receive status of respective response signals thereto. This enables determination of the data transfer rate based on the actual status of data transmission and reception, so that the data transfer rate can be adapted depending on the communication environment.

DESCRIPTION OF EMBODIMENTS

Embodiments of the present invention will be described in detail with reference to the drawings.

Embodiment 1

A first embodiment of the present invention is now described.

In this embodiment, an air conditioning unit refers to an indoor unit, an outdoor unit, or a remote controller of an air conditioner.

Figure 1:
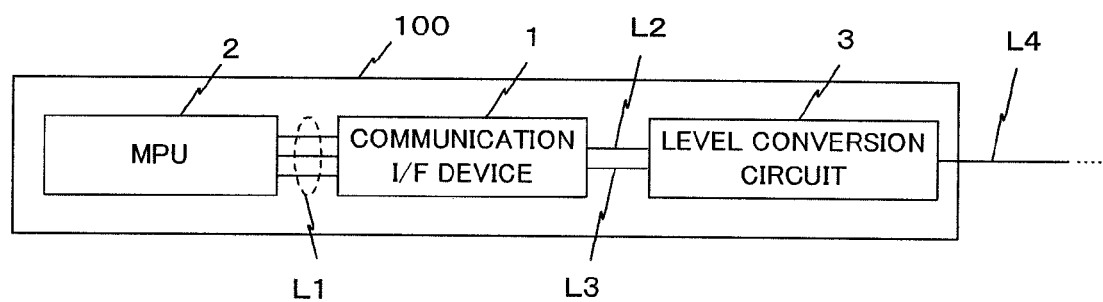
FIG. 1 is a block diagram that illustrates a configuration of an air conditioning unit incorporating a communication interface device according to a first embodiment of the present invention.

FIG. 1 shows a configuration of an air conditioning unit 100 according to this embodiment. As shown in FIG. 1, the air conditioning unit 100 incorporates a communication interface (I/F) device 1. The communication I/F device 1 is installed with a Field-Programmable Gate Array (FPGA) and an Application Specific Integrated Circuit (ASIC), for example.

More specifically, the air conditioning unit 100 comprises the communication I/F device 1, a Micro Processing Unit (MPU) 2, and a level conversion circuit 3.

The communication I/F device 1 is connected to the MPU 2 via a dedicated communication line L1, which is a serial transmission channel. The communication I/F device 1 is connected to the level conversion circuit 3 via dedicated communication lines L2 and L3, which are serial transmission channels. Also, the level conversion circuit 3 is connected to another air conditioning unit (not shown) via a communication line L4, which is a serial transmission channel. The dedicated communication lines L2 and L3 are connected to each other, and always coincide in their signal level changes.

The MPU 2 comprehensively controls the entire air conditioning unit 100 and handles data communication with an MPU of another air conditioning unit connected thereto via communication line L4, so as to allow for collaborative operations among the air conditioning units.

The level conversion circuit 3 shifts a voltage of a signal that has been output via the dedicated communication line L2 from the communication I/F device 1, and outputs the signal with the shifted voltage to the communication line L4. Also, the level conversion circuit 3 shifts a voltage of a signal that has been input via the communication line L4 to a suitable voltage for the communication I/F device 1, and outputs the signal with the suitable voltage to the communication I/F device 1.

The communication I/F device 1 functions as an external communication interface of the MPU 2 via the level conversion circuit 3.

Figure 2:
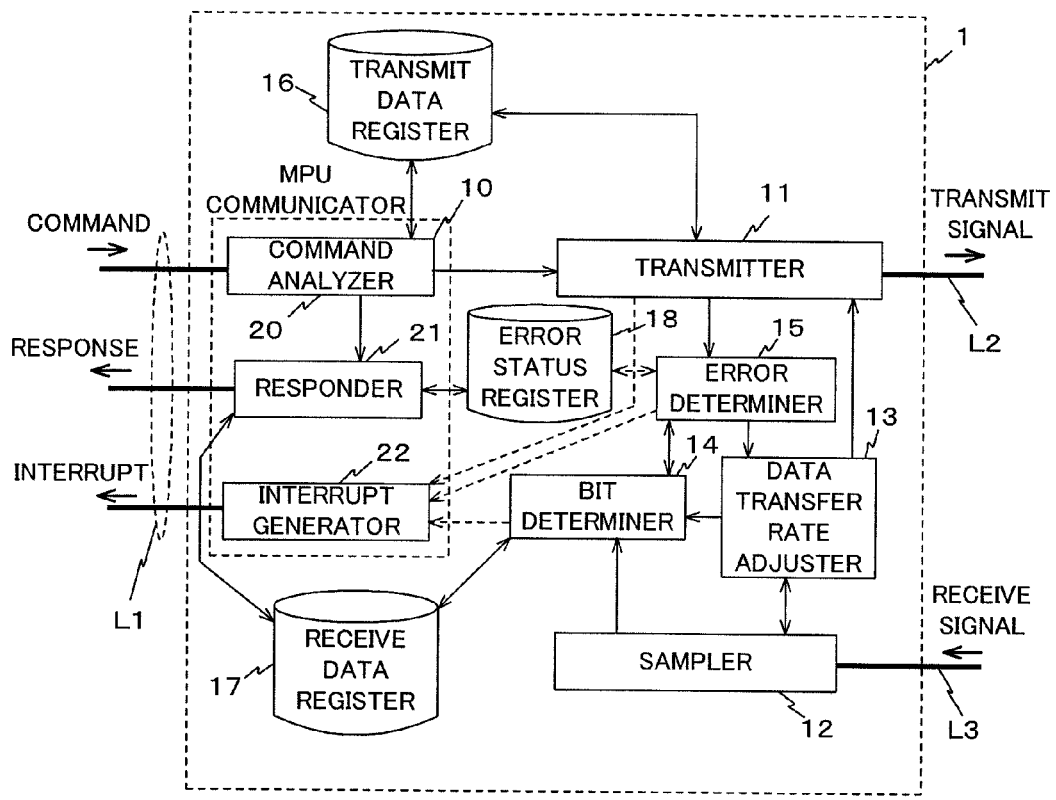
FIG. 2 is a block diagram that illustrates a schematic configuration of the communication interface device of FIG. 1.

FIG. 2 schematically shows a configuration of the communication interface (I/F) device 1 according to this embodiment. The communication I/F device 1 comprises a Micro Processing Unit (MPU) communicator 10, a transmitter 11, a sampler 12, a data transfer rate adjuster 13, a bit determiner 14, an error determiner 15, a transmit data register 16, a receive data register 17, and an error status register 18, as shown in FIG. 2.

The MPU communicator 10 is connected to the MPU 2 via the dedicated communication line L1. The MPU communicator 10 sends to and receives from the MPU 2 a command, a response, and an interrupt signal. The MPU communicator 10 comprises a command analyzer 20, a responder 21, and an interrupt generator 22. The MPU communicator 10 outputs, to the transmitter 11, serial data that has been sent by the MPU 2, and outputs, to the MPU 2, serial data that has been acquired by the bit determiner 14.

The command analyzer 20 analyzes the command received via the dedicated communication line L1 from the MPU 2. The responder 21 returns based on the command analysis result, response data to the MPU 2 via the dedicated communication line L1. The interrupt generator 22 outputs an interrupt signal via the dedicated communication line L1 to the MPU 2.

The transmitter 11 is connected to the level conversion circuit 3 via the dedicated communication line L2. The transmitter 11 sends a transmit signal that contains the serial data sent by the MPU 2, via the dedicated communication line L2 to the level conversion circuit 3.

The sampler 12 is connected to the level conversion circuit 3 via the dedicated communication line L3. The sampler 12 is a hardware circuit that samples, at a preset sampling interval, a receive signal received via the dedicated communication line L3. A sampling frequency is set to be sufficiently greater than a bit rate of the receive signal.

The data transfer rate adjuster 13 functions as a data transfer rate measurer that measures the data transfer rate based on the number of start bit samples in the receive signal sampled by the sampler 12. Additionally, the data transfer rate adjuster 13 also functions as an adjuster that adjusts, when the transmitter 11 sends the transmit signal multiple times at different data transfer rates, the data transfer rate based on the receive status of respective response signals thereto.

The bit determiner 14 makes a bit determination regarding the receive signal that has been received via the dedicated communication line L3 at the data transfer rate measured by the data transfer rate adjuster 13. The bit determiner 14 thus acquires the serial data contained in the receive signal.

The error determiner 15 determines whether or not a receive error exists in the serial data acquired by the bit determiner 14.

In the transmit data register 16, the serial data sent by the transmitter 11 is stored. In the receive data register 17, the serial data acquired through the bit determination by the bit determiner 14 is stored. In the error status register 18, a result of the error determination by the error determiner 15 is stored.

Although not shown in FIG. 2, the communication I/F device 1 comprises a timer that tracks time.

Figure 3:
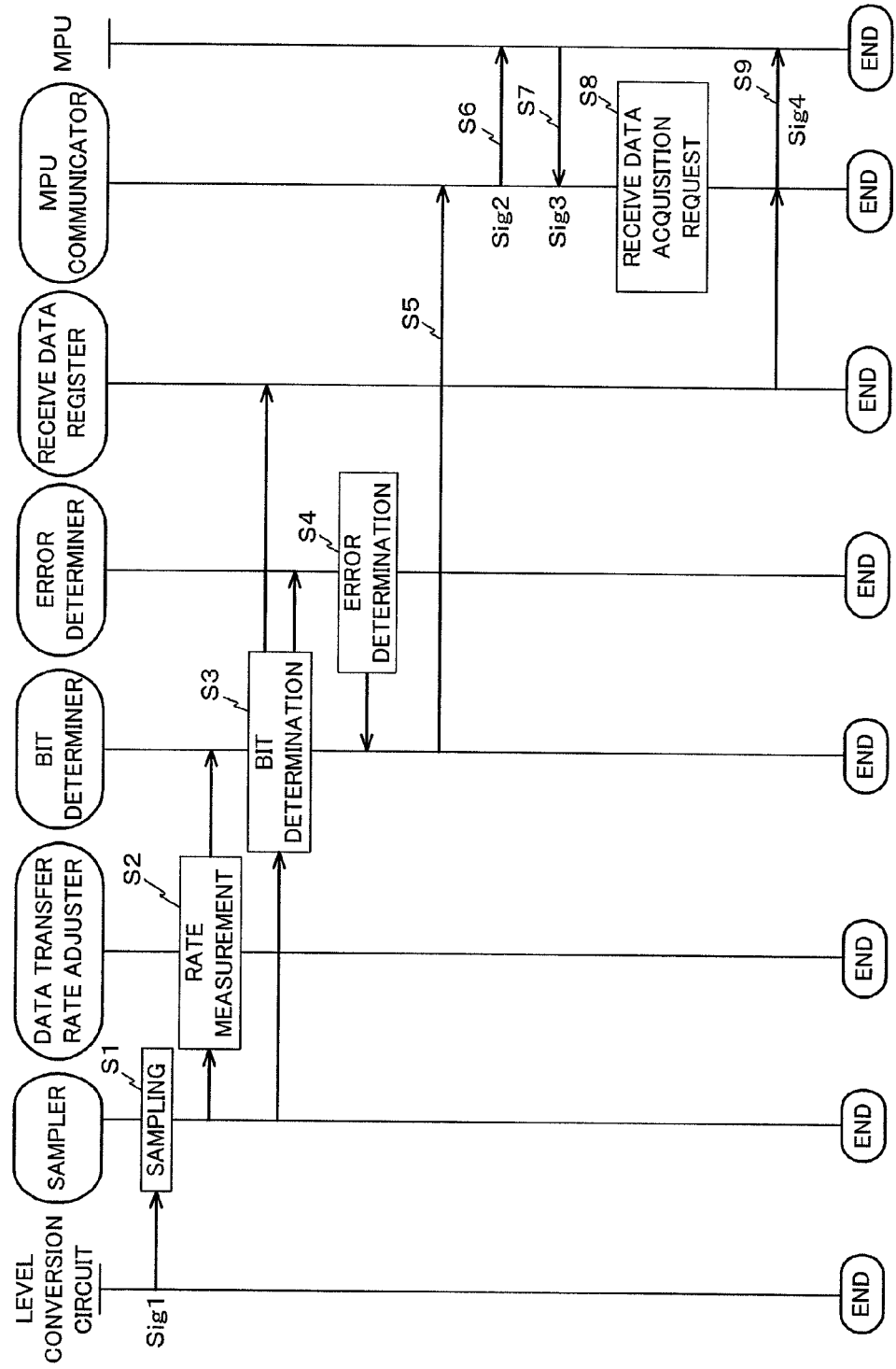
FIG. 3 is a sequence diagram that illustrates a process flow when a receive signal is received.

FIG. 3 shows a process flow from when the communication I/F device 1 receives the receive signal from the level conversion circuit 3 till when the communication OF device 1 hands over the serial data to the MPU 2.

Upon receipt of a receive signal Sig 1 via the dedicated communication line L3 from the level conversion circuit 3, the sampler 12 samples the receive signal Sig 1 (Step S1). The sampling is performed periodically based on the time tracked by the timer. The sampled receive signal is output to the data transfer rate adjuster 13 and bit determiner 14. Note that the shorter a sampling period, the more desirable.

Here, the receive signal Sig 1 is configured with 11 bits for each frame: 1 start bit; 8 data bits; 1 parity bit; and 1 stop bit.

The data transfer rate adjuster 13 then measures a data transfer rate based on a bit width (the number of samples) of the start bit sampled by the sampler 12 (Step S2). The measured data transfer rate is output to the bit determiner 14.

The bit determiner 14 determines the bits (the data bits, the parity bit, and the stop bit) that follow the start bit at the data transfer rate measured by the data transfer rate adjuster 13 (Step S3). After bit values are determined for a specified number of bits, the serial data acquired through the bit determination is stored in the receive data register 17 and is also output to the error determiner 15.

The error determiner 15 makes an error determination regarding the bit determination result (Step S4). If no error is detected, the error determiner 15 outputs the result to the bit determiner 14.

In response to this, the bit determiner 14 outputs an interrupt command to the MPU communicator 10 (the interrupt generator 22) (Step S5). The MPU communicator 10 (the interrupt generator 22) in turn outputs a receive interrupt signal Sig 2 to the MPU 2 (Step S6). Here, the 11 bits in each frame are defined as a number of bits specified in the receive interrupt signal Sig 2.

Upon receiving the receive interrupt signal Sig 2, the MPU 2 sends a receive data acquisition command Sig 3 to the MPU communicator 10 (the command analyzer 20) (Step S7). Upon receiving the receive data acquisition command Sig 3, the MPU communicator 10 (the command analyzer 20) extracts a receive data acquisition request based on an analysis result (Step S8). The MPU communicator 10 (the responder 21) sends the serial data read from the receive data register 17 to the MPU 2 as response data Sig 4 (Step S9).

In this instance, the command, response, and interrupt signal are sent and received between the communication I/F device 1 and MPU 2 using the clock synchronization type serial communication. These signals are sent and received in increments of 8 bits.

Figure 4:
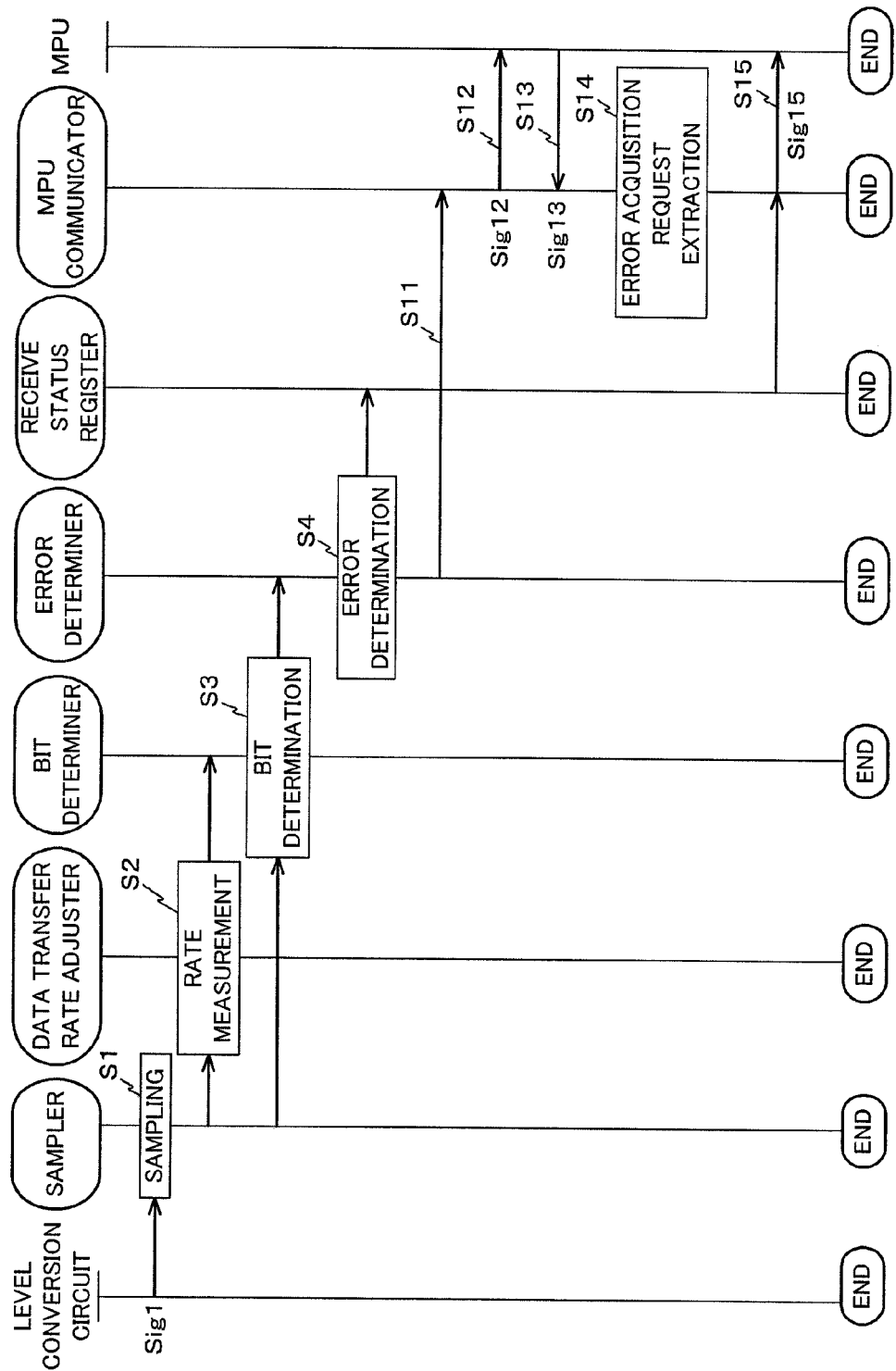
FIG. 4 is another sequence diagram that illustrates a process flow when a receive signal is received.

FIG. 4 shows a process flow when an error is detected by the error determiner 15. Upon detecting an error, the error determiner 15 stores the error status in the error status register 18, as shown in FIG. 4 (Step S4). The error determiner 15 then outputs an error interrupt command to the MPU communicator 10 (the interrupt generator 22) (Step S11).

The MPU communicator 10 (the interrupt generator 22) sends an error interrupt signal Sig 12 to the MPU 2 (Step S12). Upon receiving the error interrupt signal Sig 12, the MPU 2 sends an error acquisition command Sig 13 to the MPU communicator 10 (the command analyzer 20) (Step S13).

The MPU communicator 10 (the command analyzer 20) analyzes the received error acquisition command Sig 13 and extracts an error acquisition request (Step S14). The MPU communicator 10 (the responder 21) sends the error status stored in the error status register 18 to the MPU 2 as response data Sig 15 (Step S15). At this point, the error status register 18 is cleared.

The error determination involves detecting: a parity error that indicates that the parity bit does not have a normal value; and a stop bit error that indicates that the stop bit does not have a normal value.

If the error determiner 15 detects a receive error, the data transfer rate may be reduced by the data transfer rate adjuster 13.

Figure 5:
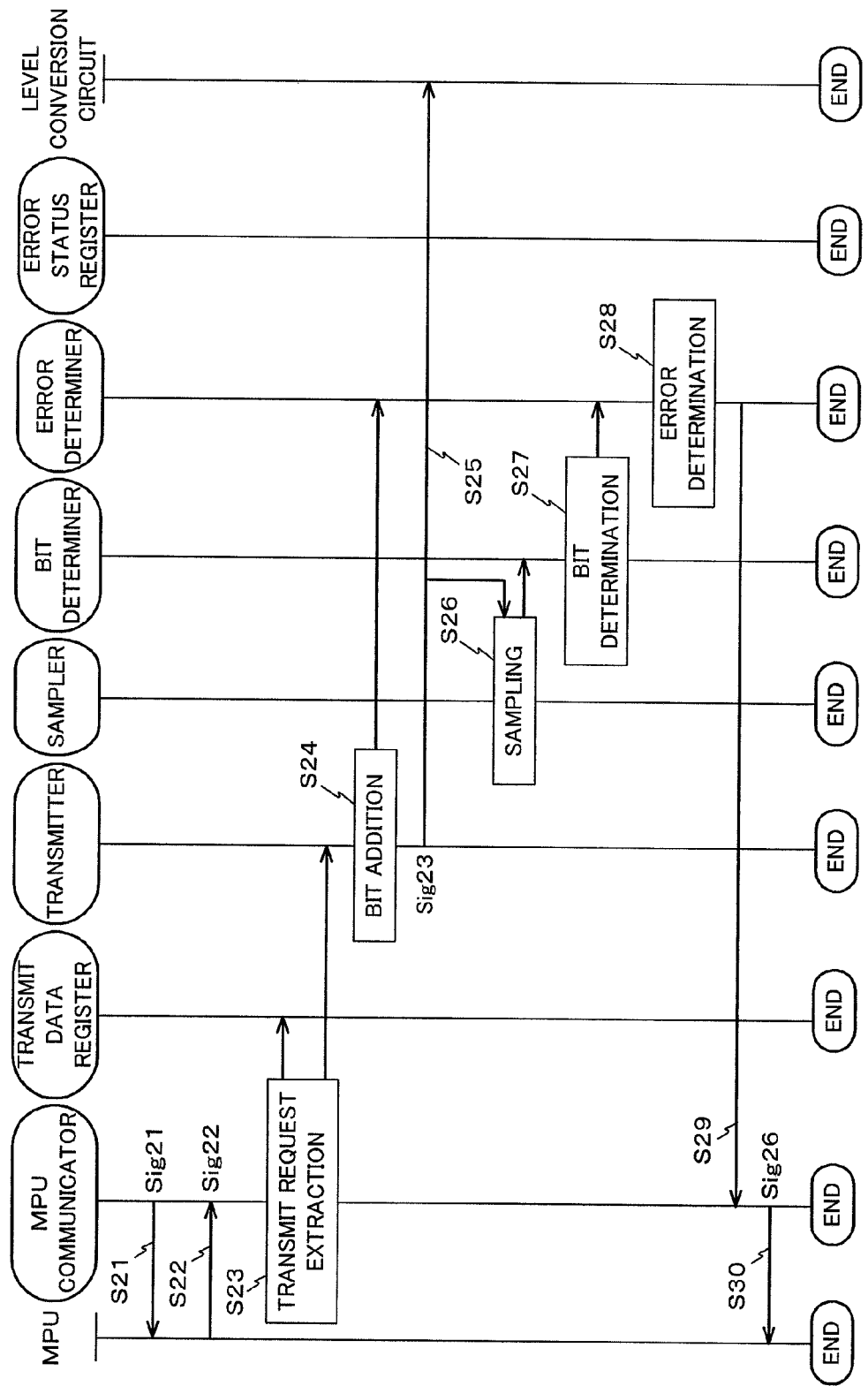
FIG. 5 is a sequence diagram that illustrates a process flow when a transmit signal is sent.

Next, a process flow from when the communication I/F device 1 receives the transmit signal from the MPU 2 till when the communication I/F device 1 sends the transmit signal to the level conversion circuit 3 will be described with reference to the FIG. 5.

When the communication I/F device 1 is ready to receive the transmit signal from the MPU 2, the MPU communicator 10 (the interrupt generator 22) sends an interrupt signal indicating the transmittable status Sig 21 to the MPU 2 (Step S21). Upon receiving the interrupt signal indicating the transmittable status Sig 21, the MPU 2 sends a transmit command and transmit data Sig 22 to the MPU communicator 10 (the command analyzer 20) (Step S22).

The MPU communicator 10 (the command analyzer 20) analyzes the command to extract a transmit request (Step S23). Here, the transmit data (serial data) is stored in the transmit data register 16. The MPU communicator 10 (the command analyzer 20) outputs the transmit request to the transmitter 11.

The transmitter 11 adds a start bit, a parity bit, and a stop bit, to 8 bits of transmit data stored in the transmit data register 16 (Step S24). The transmit data after the addition is output to the error determiner 15.

Similarly to the receive signal, the transmit signal is configured with 1 start bit, 8 data bits, 1 parity bit, and 1 stop bit for each frame.

The transmit command and the transmit data that are transmitted from the MPU 2 to the communication I/F device 1 each have an 8-bit data size, and are transmitted using the clock synchronizing type serial communication, similarly as they are received.

The transmitter 11 then sends, via serial transmission, transmit signal Sig 23 each containing serial data, to the level conversion circuit 3 at an initial data transfer rate or the adjusted data transfer rate adjusted by the data transfer rate adjuster 13 (Step S25).

As the dedicated communication lines L2 and L3 coincide in their signal level, the sampler 12 is capable of receiving the transmit signal Sig 23. The sampler 12 samples this transmit signal Sig 23 (Step S26). The bit determiner 14 makes a bit determination regarding the sampled transmit signal Sig 23 (Step S27). This enables acquisition of the serial data that has been received at the data transfer rate set by the transfer rate adjuster 13. The received serial data is sent to the error determiner 15 via the bit determiner 14.

The error determiner 15 compares the sent serial data with the received serial data (Step S28). If the comparison result shows that the data is consistent, the error determiner 15 outputs a transmit completion interrupt command to the MPU communicator 10 (the interrupt generator 22) (Step S29). The MPU communicator 10 (the interrupt generator 22) sends a transmit completion interrupt signal Sig 26 to the MPU 2 (Step S30).

Figure 6:
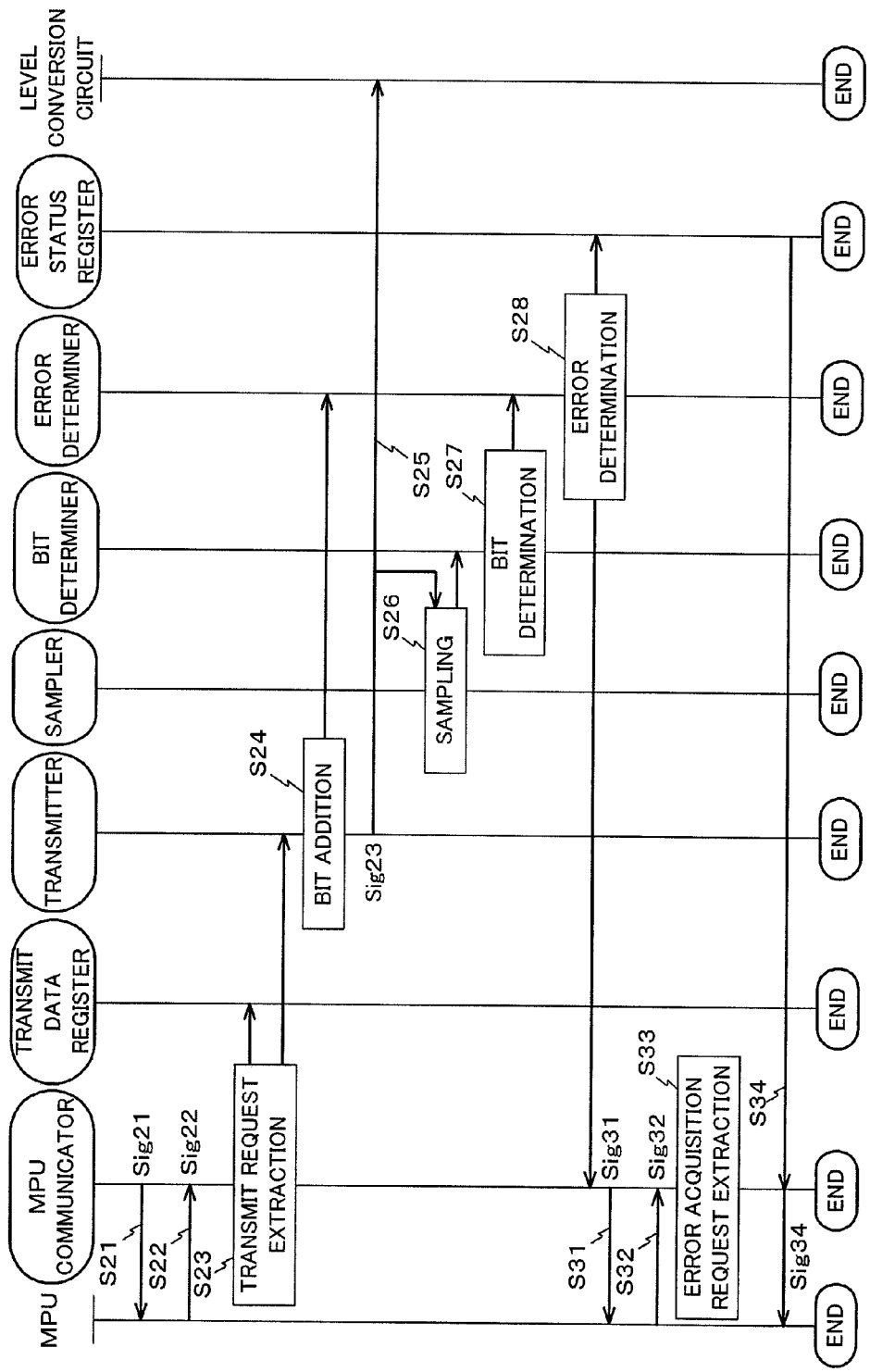
FIG. 6 is another sequence diagram that illustrates a process flow when a transmit signal is sent.

As shown in FIG. 6, if the comparison result shows inconsistency between the sent serial data and received serial data, the error determiner 15 determines that there is a data conflict error, then stores the error status in the error status register 18 and outputs an error interrupt command to the MPU communicator 10 (the interrupt generator 22) (Step S28).

The MPU communicator 10 (the interrupt generator 22) sends to the MPU 2 an error interrupt signal Sig 31 (Step S31). Upon receiving the error interrupt signal Sig 31, the MPU 2 sends an error acquisition command Sig 32 to the MPU communicator 10 (the command analyzer 20) (Step S32). The MPU communicator 10 (the command analyzer 20) analyzes the error acquisition command Sig 32 to extract an error acquisition request (Step S33). The MPU communicator 10 (the responder 21) sends the error status stored in the error status register 18, to the MPU 2 as response data Sig 34 (Step S34). At this point, the error status register 18 is cleared.

Next, a process of setting the data transfer rate in the data transfer rate adjuster 13 will be described with reference to FIGS. 7A, 7B and 8.

Figure 7A:
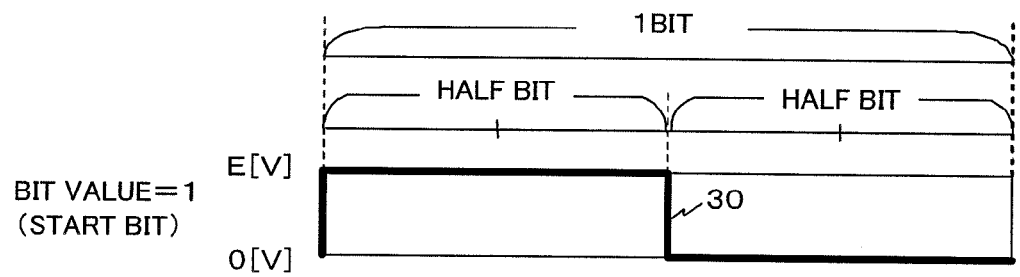
FIGS. 7A and 7B are diagrams that illustrate examples of a signal waveform in the Return to Zero (RZ) system, which is a coding mode on a transmission channel.
Figure 7B:
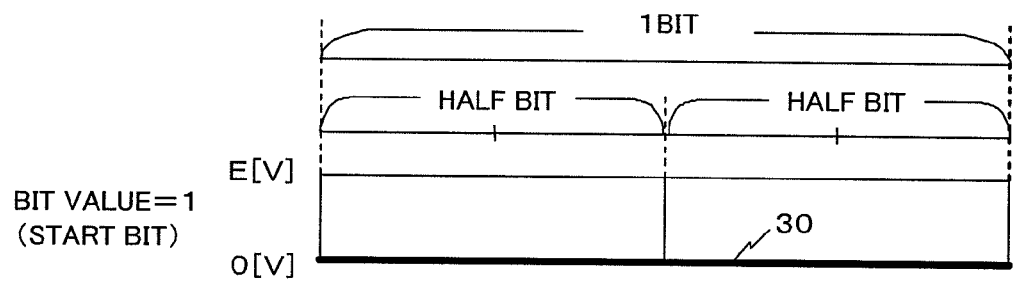

FIGS. 7A and 7B show signal waveforms 30 in a Return to Zero (RZ) system, which is a code system on transmission channels. In this embodiment, of all bits in the transmit signal and receive signal, at least the start bit is represented using this system.

A signal waveform 30 of a start bit with a value of 1 is as shown in FIG. 7A. This signal waveform 30 has a first half bit length that is at a high level and a second half bit length that is at a low level. In this instance, a half bit length is a half of a 1-bit length.

On the other hand, a signal waveform 30 of a start bit with a value of 0 is as shown in FIG. 7B. This signal waveform has a 1-bit length that is at the low level.

In this embodiment, the start bit has a value of 1, whereas the stop bit has a value of 0. Furthermore, in a data-transmission-less period, the signal level of the dedicated communication lines L2 and L3 is maintained at the low level.

Even if a bit subsequent to the start bit has a value of 1, the use of the RZ system for the start bit allows separation between the start bit and the subsequent bit, so that the determination of the start bit length is possible.

Figure 8:
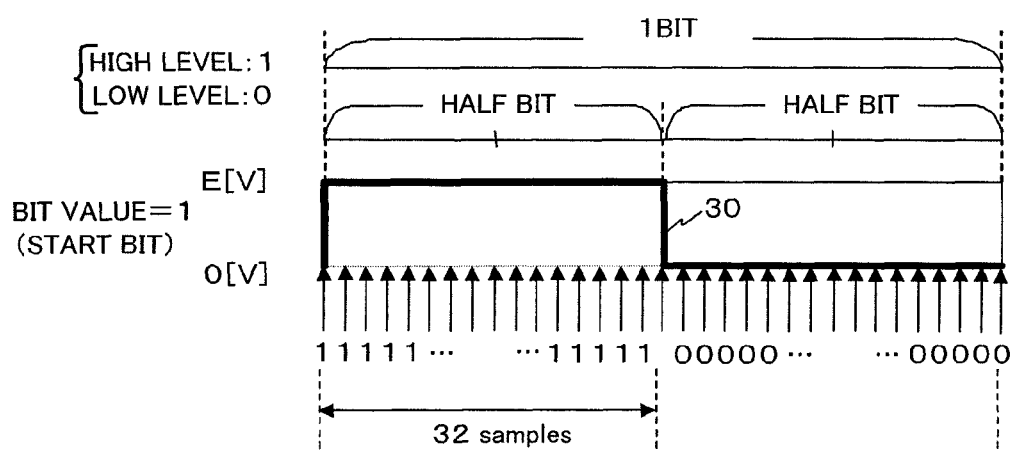
FIG. 8 is a schematic diagram for explaining a data transfer rate measurement process.

FIG. 8 schematically shows a process of calculating the data transfer rate. As shown in FIG. 8, the sampler 12 samples a 1-bit of receive signal multiple times at a predetermined sampling period. First, the data transfer rate adjuster 13 calculates a successive number of samples "n" in which the sampled value is 1. In the example shown in FIG. 8, the calculated number "n" is 32.

The data transfer rate adjuster 13 then calculates a data transfer rate R [bps] using the following expression (1):

$$R=1/(2*n*T)[bps] \quad (1)$$

wherein, T [s] represents a sampling period. The number "n" represents, as shown above, the successive number of samples with a value of 1 (high level). The denominator (2*n*T) [s/bit] of the expression (1) represents a 1-bit length.

Figure 9:
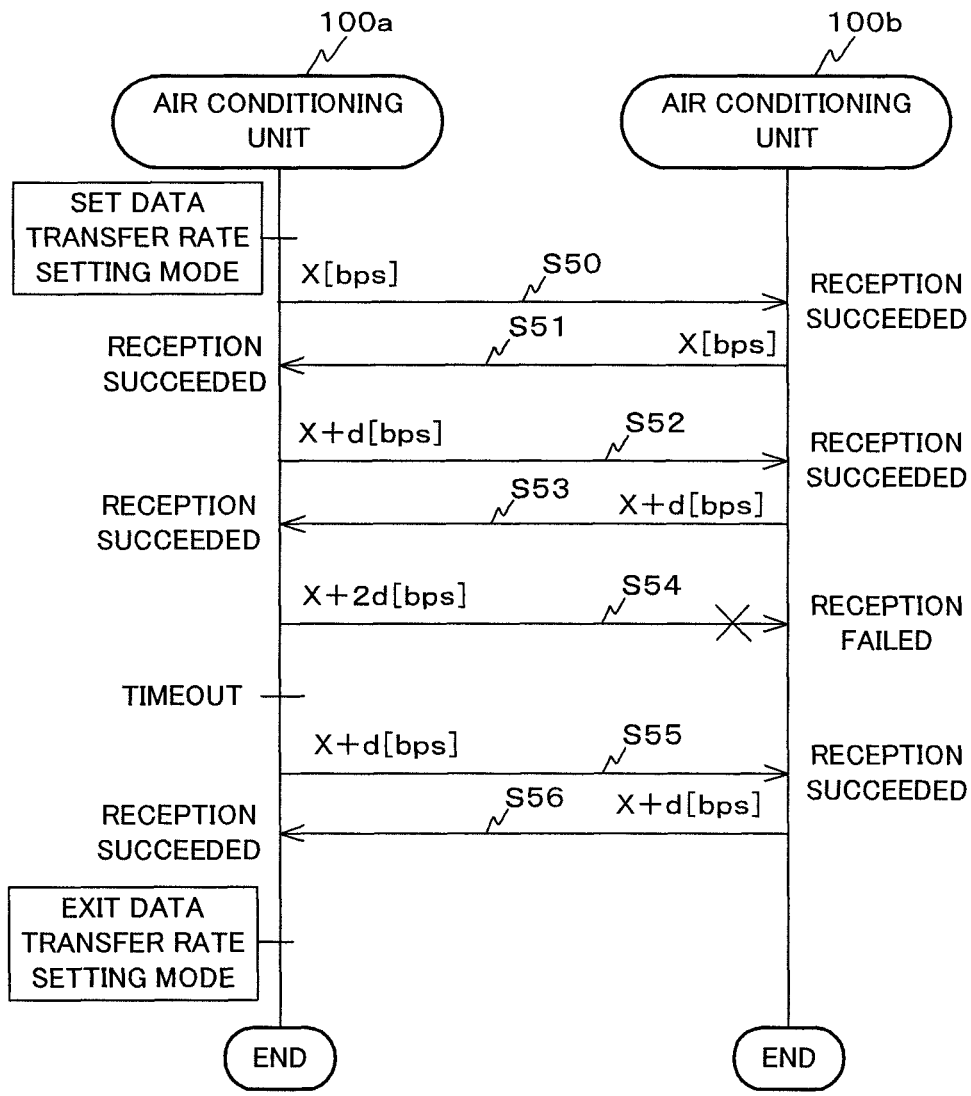
FIG. 9 is a sequence diagram for explaining a situation of data transfer rate adjustment between air conditioning units.

Next, the adaptation of the data transfer rate depending on a communication environment in this embodiment will be described, with reference to FIG. 9.

The setting of the data transfer rate between air conditioning units 100a and 100b starts when the air conditioning unit 100a enters a data transfer rate setting mode. The data transfer rate setting mode is set when a request command for setting the data transfer rate setting mode is received by the communication I/F device 1 of the air conditioning unit 100a from the MPU 2. At this point, the data transfer rate adjuster 13 starts to adjust the data transfer rate.

The air conditioning unit 100a first sends a transmit signal to the air conditioning unit 100b at a preset initial data transfer rate X [bps] (Step S50). In the air conditioning unit 100b, the data transfer rate adjuster 13 measures the data transfer rate based on the start bit, and then if the transmit signal is successfully received at the measured data transfer rate (that is, no error), the data transfer rate adjuster 13 sets the data transfer rate as an own data transfer rate to be used in transmission/reception, and the transmitter 11 sends a response signal to the air conditioning unit 100a (Step S51).

In the air conditioning unit 100a, the data transfer rate adjuster 13 measures the data transfer rate based on the start bit, and then if the response signal is successfully received at the measured data transfer rate, the data transfer rate adjuster 13 sets X+d [bps], which is greater than the current data-transfer rate X [bps], as an own data transfer rate to be used in transmission/reception, and the transmitter 11 resends a transmit signal to the air conditioning unit 100b (Step S52).

In the conditioning unit 100b, the data transfer rate adjuster 13 measures the data transfer rate based on the start bit, and then if the transmission signal is successfully received at the measured data transfer rate, the data transfer rate adjuster 13 sets the measured data transfer rate as the own data transfer rate to be used in transmission/reception, and the transmitter 11 sends a response signal to the air conditioning unit 100a (Step S53).

Thus, the air conditioning units 100a and 100b repeat transmission and reception of the transmit signal and response signal, while increasing the data transfer rate by d [bps]; provided that the transmit signal and the response signal are successfully transmitted and received, respectively.

Consider the case where, in the air conditioning unit 100b, the data transfer rate adjuster 13 measures the data transfer rate based on the start bit, and then the error determiner 15 detects an error, thus resulting in a failure to receive the transmit signal at the measured data transfer rate (Step S54). In this instance, as the air conditioning unit 100b does not transmit a response signal, a timeout occurs in the air conditioning unit 100a.

When the timeout has occurred, the air conditioning unit 100a sets a one-level lower data transfer rate (for example, X+d [bps] if the current data transfer rate is X+2d [bps]) as the own data transfer rate, and resends a transmit signal S20 to the air conditioning unit 100b (Step S55). In the air conditioning unit 100b, the data transfer rate adjuster 13 measures a data transfer rate from a start bit, and then if the transmit signal is successfully received at the measured data transfer rate, a response signal is transmitted to the air conditioning unit 100b at the current data transfer rate (X+d [bps]) (Step S56).

If the response signal to the transmit signal is successfully received, the air conditioning unit 100a decide to set the current data transfer rate as the own data transfer rate, and exits the data transfer rate setting mode.

In other words, in the data transfer rate setting mode, if the response signal to the transmit signal sent from the transmitter 11 is successfully received at the measured data transfer rate, the data transfer rate adjuster 13 causes the transmitter 11 to resend the transmit signal at a greater data transfer rate than the measured data transfer rate. On the other hand, if the receipt of the response signal fails, the data transfer rate adjuster 13 causes the transmitter 11 to resend the transmit signal at a lesser data transfer rate than the measured data transfer rate, and afterwards if the response signal is successfully received, the data transfer rate adjuster 13 sets the current data-transfer rate as the own data transfer rate to be used in transmission/reception.

As described in detail above, according to the communication I/F device 1 of this embodiment, it becomes possible to receive a receive signal at a data transfer rate depending on the receive signal and to adapt the data transfer rate depending on a communication environment, without increasing the burden on the MPU 2. This will improve the speed and quality in communications among the air conditioning units.

In this embodiment, the signal waveform of the start bit is in the RZ system. Specifically, the signal waveform of the start bit has the first half bit that is at the high level and the second half bit that is at the low level. However, the first half bit may be at the low level whereas the second half bit at the high level. In this instance, the data transfer rate adjuster 13 may measure the data transfer rate based on a successive number of start bit samples having a sampled value of the low level.

Also, in this embodiment, in setting the data transfer rate, the transmit signal and the response signal that are sent and received between the air conditioning units 100a and 100b may contain information indicating the current data-transfer rate.

Furthermore, the communication I/F device 1 according to this embodiment may receive from the MPU 2 a data transfer rate setting command, to thereby shift the data transfer rate.

Embodiment 2

A second embodiment of the present invention is now described.

Figure 10:
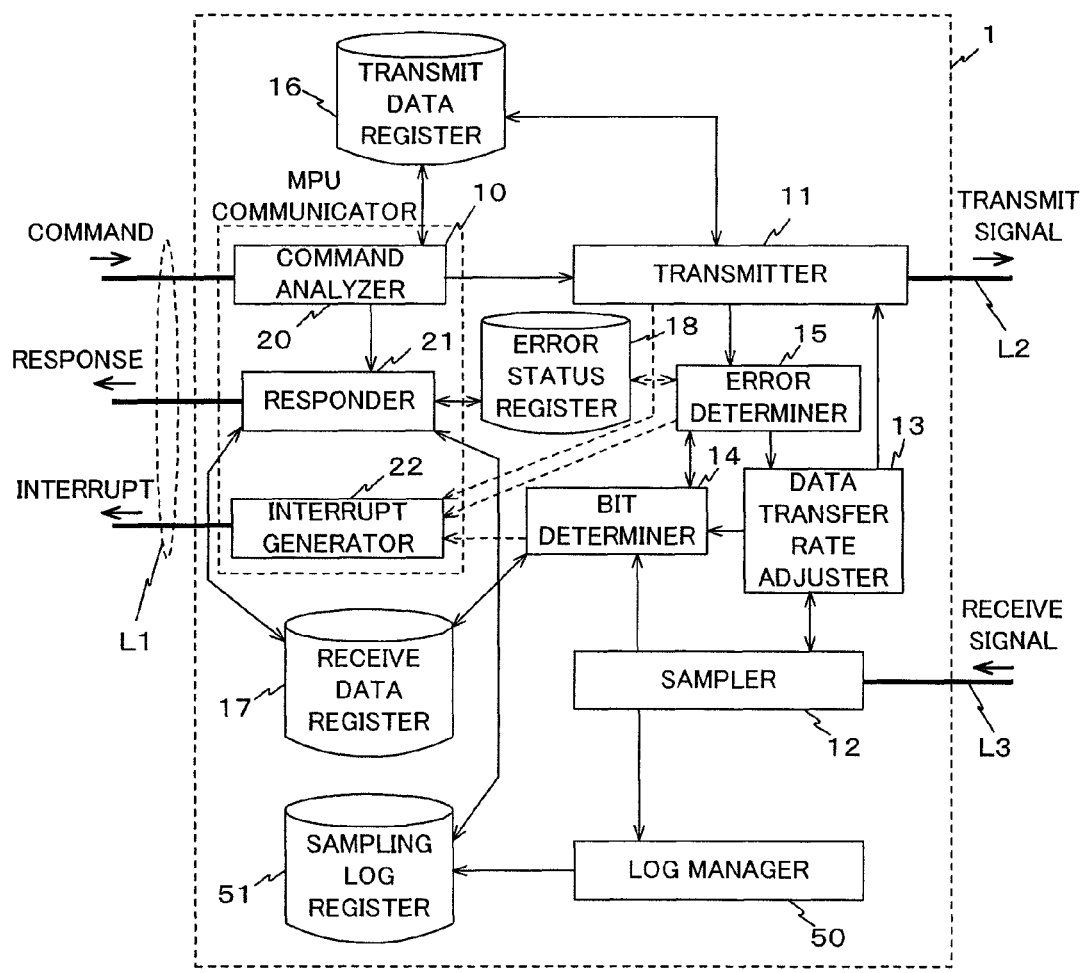
FIG. 10 is a block diagram that illustrates a configuration of a communication interface device according to a second embodiment of the present invention.

FIG. 10 shows the configuration of a communication I/F device 1 according to the second embodiment of the present invention. As shown in FIG. 10, compared to the above described first embodiment, the communication I/F device 1 according to the second embodiment further comprises a log manager 50 and a sampling log register 51 for storing values obtained through sampling by the sampler 12. In this embodiment, the same compositional elements as those of the above first embodiment are appended with the same numerals, and not further described.

The log manager 50 stores, in the sampling log register 51, values obtained through sampling by the sampler 12. The sampling log register 51 can contain a given number of the sampled values. In this sampling log register 51, when the number of the sampled values reaches the given maximum number, the sampled values are overwritten from the oldest sampling value.

With no need to store all of the sampled value in the sampling log register 51, the log manager 50 may store the sampled value at a rate of, for example, one in several times. The log manager 50 may also repeat a process of successively storing a given number of sampled values followed by discarding the certain number of sampled values.

When the MPU 2 sends a sampling log acquisition command to the communication I/F device 1, the command analyzer 20 of the communication I/F device 1 analyzes the command, and the responder 21 sends to the MPU 2 the values stored in the sampling log register 51 as response data.

Figure 11A:
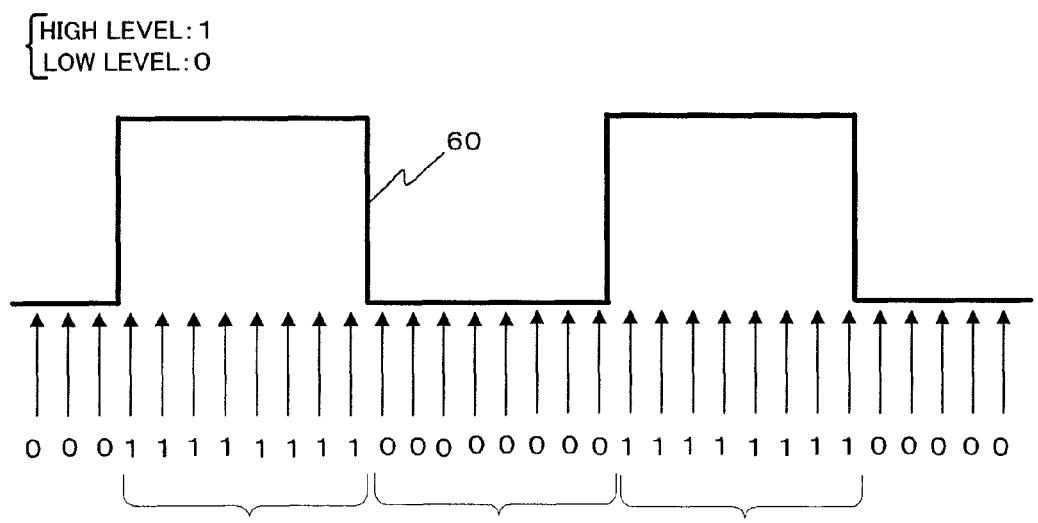
FIG. 11A is a diagram that illustrates a signal waveform immediately after transmission.
Figure 11B:
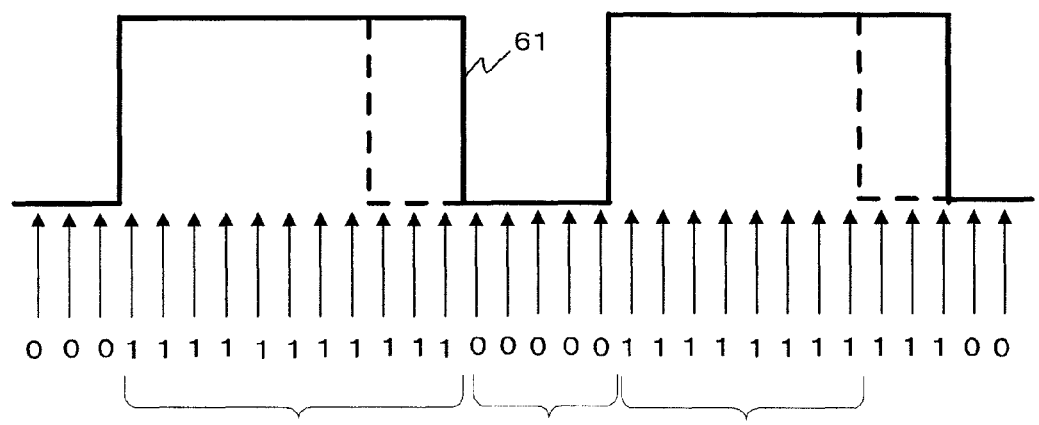
FIG. 11B is a diagram that illustrates a signal waveform immediately before reception.

The MPU 2 uses time-series log data of the received sampled values to analyze communication errors. An example of the analysis is now described with reference to FIGS. 11A and 11B. FIG. 11A shows a signal waveform 60 immediately after sent from a transmit end, the air conditioning unit 100a. FIG. 11B shows a signal waveform 61 immediately before received by a receive end, the air conditioning unit 100b.

As can be seen from the comparison of FIGS. 11A with 11B, the signal waveform 61 immediately before received is distorted due to the noise and the delay during a voltage drop from the high level to low level.

Such distortion in the receive signal waveform may cause a difficulty for the air conditioning unit at the receive end to accurately calculate the data transfer rate based on a half bit width of the start bit.

To deal with this, the MPU 2 sends the sampling log acquisition command to the communication I/F device 1, to thereby acquire the time-series log data of the sampled values. By doing this, the MPU 2 can recognize the receive signal waveform to be different from an assumed shape, determine the cause of the error, and take measures against the error. For example, taking measures such as reducing the data transfer rate and changing the portion of the sampling to be used in the bit determination will enable the data reception even with the receive signal distortion. The MPU 2 sends timing adjustment information for the bit determination, via the MPU communicator 10 to the bit determiner 14. Given this timing adjustment information, the bit determiner 14 can adjust the bit determination timing.

As described in detailed above, the communication I/F device 1 according to this embodiment is capable of not only storing the sampling log, but also acquiring the sampling log through the MPU 2. This allows the MPU 2 to determine the cause of the communication errors and to take measures against the errors.

In this embodiment, the sampling log register 51 stores only the sampled values. But a sampling time tracked by the timer and the error determination results may also simultaneously be stored, so that the MPU 2 can acquire such information.

Embodiment 3

A third embodiment of the present invention is now described.

The configuration of a communication I/F device 1 according to this embodiment is the same as the configuration of the communication I/F device 1 according to the above first embodiment 1 as shown in FIG. 1. In this embodiment, the same compositional elements as those of the above first embodiment are appended with the same numerals, and are not further described.

Figure 12:
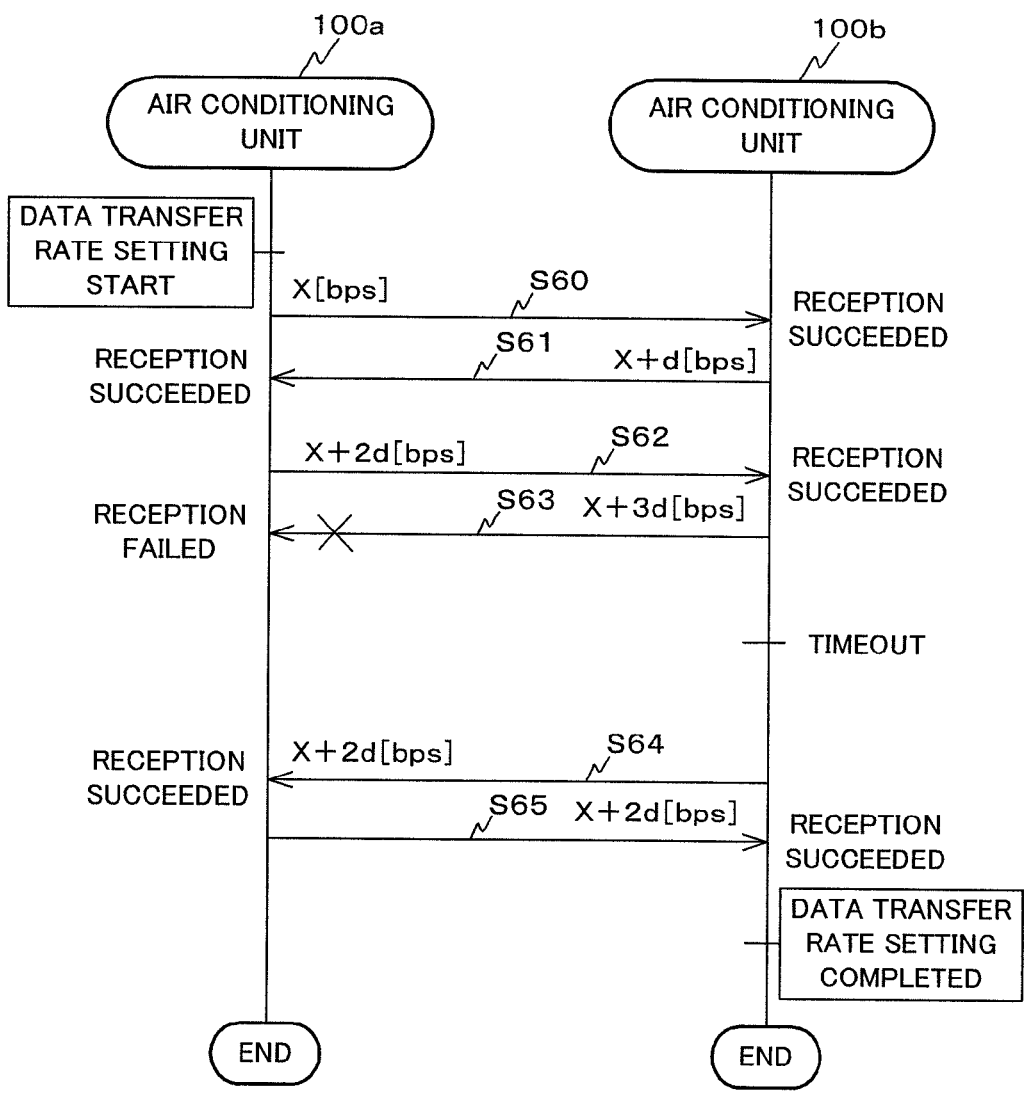
FIG. 12 is a sequence diagram for explaining a situation of data transfer rate adjustment between air conditioning units by using a communication interface device according to a third embodiment of the present invention.

With reference to FIG. 12, a process of adapting the data transfer rate depending on a communication environment between the air conditioning units in this embodiment is now described. The assumption is that the data transfer rate setting mode is set in the air conditioning units 100a and 100b.

The air conditioning unit 100a sends a transmit signal to the air conditioning unit 100b at a preset initial data transfer rate X [bps] (Step S60). The transmission of the first transmit signal starts when, in the air conditioning unit 100a, the MPU 2 sends a request command for starting to set the data transfer rate, to the communication I/F device 1.

In the air conditioning unit 100b, the data transfer rate adjuster 13 measures the data transfer rate based on the start bit, and then if the transmit signal is successfully received at the measured data transfer rate, the data transfer rate adjuster 13 sets a greater data transfer rate (X+d [bps]) than the measured data transfer rate to the transmitter 11. The transmitter 11 sends, at this data transfer rate, the transmit signal to the air conditioning unit 100a (Step S61).

In the air conditioning unit 100a, the data transfer rate adjuster 13 measures the data transfer rate based on the start bit, and then if the transmit signal is successfully received at the measured data transfer rate, the air conditioning unit 100a operates similarly to the air conditioning unit 100b at a further increased data transfer rate (X+2d [bps]) (Step S62). Thereafter, the air conditioning units 100a and 100b repeat the same process, provided that the transmit signal can successfully be received. As the process is repeated, the data transfer rate gradually increases.

In the repetitive process, the air conditioning unit 100a fails to receive the transmit signal, for example (Step S63). In this instance, the air conditioning unit 100a does not send the transmit signal to the air conditioning unit 100b. As a result, a timeout occurs in the air conditioning unit 100b. If the timeout has occurred, the air conditioning unit 100b reduces the data transfer rate by one level (for example, X+2d [bps] if the current data-transfer rate is X+3d [bps]), and sends a definitive signal to the air conditioning unit 100a (Step S64).

In the air conditioning unit 100a, the data transfer rate adjuster 13 measures the data transfer rate based on the start bit, and then if the definitive signal is successfully received at the measured data transfer rate, the air conditioning unit 100a sets the current data transfer rate (for example, X+2d [bps]) as an own data transfer rate to be used in transmission/reception, and sends a definitive response signal to the air conditioning unit 100b at the set data transfer rate (Step S65). When the air conditioning unit 100b successfully receives the definitive response signal, the process of setting the data transfer rate is completed.

If the air conditioning unit 100a that has transmitted the definitive signal fails to receive the definitive response signal with the timeout occurrence, the air conditioning unit 100b may further reduce the data transfer rate by one level (for example, X+d [bps], if the current data transfer rate is X+2d [bps]), and may set the reduced data transfer rate as an own data transfer rate to be used in transmission/reception, so as to resend the definitive signal to the air conditioning unit 100a.

In a sequence of FIG. 12, the process of setting the data transfer rate starts with the air conditioning unit 100a, but may start with the air conditioning unit 100b.

In the sequence of FIG. 12, the timeout has occurred in the air conditioning unit 100b, but may occur in the air conditioning unit 100a.

As described in detail above, according to the communication I/F device 1 of this embodiment, the data transfer rate can be adapted in a shorter time, which enables more rapid default setting of the communication I/F device 1.

In setting the data transfer rate, the transmit signal, the definitive signal, and the definitive response signal are transmitted and received between the air conditioning units 100a and 100b, in this embodiment. These signals may contain information indicating the current data transfer rate.

Various embodiments and modifications can be made to the present invention without departing from the broader spirit and scope of the present invention. Furthermore, the above described embodiments are provided for explanatory purposes, and do not limit the scope of the present invention. The scope of the present invention is, accordingly, specified by the claims, rather than the embodiments. In addition, various modifications made within the scope of the claims and equivalents thereof are regarded as within the scope of the present invention.

INDUSTRIAL APPLICABILITY

The claimed invention is suitable for data communications among air conditioning units. Specifically, applying the communication interface device according to the present invention to data communications between an indoor unit and an outdoor unit and between a remote controller and an indoor unit will enable the automatic setting of a data communication rate depending on a communication environment without increasing the burden on each processor.

REFERENCE SIGNS LIST

1. Communication interface (I/F) device
2. MPU
3. Level conversion circuit
10. MPU Communicator
11. Transmitter
12. Sampler
13. Data transmission rate adjuster
14. Bit determiner
15. Error determiner
16. Transmit data register
17. Receive data register
18. Error status register
20. Command analyzer
21. Responder
22. Interrupt generator
30. Signal waveform
50. Log manager
51. Sampling log register
60, 61. Signal waveform
100, 100a, 100b Air conditioning unit
L1. Dedicated communication line
L2, L3. Dedicated communication line
L4. Communication line

The invention claimed is:

1. A communication interface device for a processor, comprising:
a sampler that samples a receive signal received via a communication line;
a data transfer rate acquirer that acquires a data transfer rate;
a bit determiner that makes a bit determination regarding the receive signal at the acquired data transfer rate acquired by the data transfer rate acquirer, to thereby acquire serial data contained in the receive signal;
a transmitter that sends, via a communication line at the acquired data transfer rate acquired by the data transfer rate acquirer, a transmit signal containing serial data sent by the processor;
a processor communicator that outputs to the transmitter the serial data sent by the processor, and outputs to the processor the serial data acquired by the bit determiner; and
an adjuster that, when the transmitter sends the transmit signal multiple times at different data transfer rates, adjusts the data transfer rate based on the receive status of respective response signals thereto.

2. The communication interface device according to claim 1,
wherein the adjuster:
if a response signal to the transmit signal sent by the transmitter is successfully received at the acquired data transfer rate acquired by the data transfer rate acquirer, causes the transmitter to resend the transmit signal at a greater data transfer rate than the acquired data transfer rate; and
if reception of the response signal fails, causes the transmitter to resend the transmit signal at a lesser data transfer rate than the acquired data transfer rate, and then if a response signal to the transmit signal is successfully received, sets a current data transfer rate as a data transfer rate to be used in transmission.

3. The communication interface device according to claim 1,
wherein the adjuster:
if the receive signal is successfully received at the acquired data transfer rate acquired by the data transfer rate acquirer, causes the transmitter to send the transmit signal at a greater data transmit rate than the acquired data transfer rate; and
if, after the transmission of the transmit signal, the receive signal is not received and a timeout has occurred, causes the transmitter to resend a definitive signal at a lesser data transfer rate than the acquired data transfer rate, and then if a response signal to the definitive signal is successfully received, sets a current data transfer rate as a data transfer rate to be used in transmission.

4. The communication interface device according to claim 1, wherein when a data transfer rate setting command is input via the processor communicator from the processor, the adjuster starts to adjust the data transfer rate.

5. The communication interface device according to claim 1, further comprising an error determiner that determines whether or not an error exists in the serial data acquired by the bit determiner, wherein
if the error determiner determines that a receive error exists, the processor communicator outputs the contents of the receive error to the processor.

6. The communication interface device according to claim 5, further comprising a sampling log register for storing log data of the sampling by the sampler,
wherein the processor communicator outputs, in response to a request from the processor, the log data stored in the sampling log register to the processor.

7. The communication interface device according to claim 6, wherein the bit determiner adjusts timing for the bit determination based on the log data stored in the sampling log register.

8. The communication interface device according to claim 5, wherein
the sampler samples the transmit signal sent by the transmitter as the receive signal, if the serial data sent by the processor and the serial data acquired by the bit determiner are inconsistent, the error determiner determines that a data conflict error exists, and if the error determiner determines that a data conflict error exists, the processor communicator outputs the contents of the data conflict error to the processor.

9. The communication interface device according to claim 1, wherein the data transfer rate acquirer acquires the data transfer rate based on a number of start bit samples contained in the receive signal.

10. The communication interface device according to claim 9, wherein the data transfer rate acquirer:

acquires a number of samples corresponding to a half bit width of a start bit in a Return to Zero (RZ) system, based on a result of the sampling of the receive signal by the sampler; and calculates the data transfer rate of the receive signal based on the measured number of samples.

11. An air conditioner comprising the communication interface device according to claim 1.

12. A communication control method using a communication interface device for a processor, the method comprising:

a sampling step of sampling a receive signal received via a communication line;

a data transfer rate acquiring step of acquiring a data transfer rate;

a bit determination step of making a bit determination regarding the receive signal at the acquired data transfer rate, to thereby acquire serial data contained in the receive signal;

a transmitting step of sending, via a communication line at the acquired data transfer rate, a transmit signal containing serial data sent by the processor;

a processor communication step of receiving the serial data sent by the processor, and of outputting to the processor the serial data acquired at the bit determination step; and an adjustment step of, when the transmit signal is sent multiple times at different data transfer rates at the transmitting step, adjusting the data transfer rate based on the receive status of respective response signals thereto.

13. A non-transitory computer-readable recording medium recording a program to cause a computer that operates as a communication interface device for a processor to function as:

a sampler that samples a receive signal received via a communication line;

a data transfer rate acquirer that acquires a data transfer rate;

a bit determiner that makes a bit determination regarding the receive signal at the acquired data transfer rate acquired by the data transfer rate acquirer, to thereby acquire serial data contained in the receive signal;

a transmitter that sends, via a communication line at the acquired data transfer rate acquired by the data transfer rate acquirer, a transmit signal containing serial data sent by the processor;

a processor communicator that outputs to the transmitter the serial data sent by the processor, and outputs to the processor the serial data acquired by the bit determiner; and an adjuster that, when the transmitter sends the transmit signal multiple times at different data transfer rates, adjusts the data transfer rate based on the receive status of respective response signals thereto.

* * * * *